Jan. 6, 1953  A. W. SAWITZKE  2,624,523
FISHING REEL DEVICE

Filed May 23, 1949  2 SHEETS—SHEET 1

*INVENTOR.*
ARTHUR W. SAWITZKE
BY
*Attorneys*

Jan. 6, 1953     A. W. SAWITZKE     2,624,523
FISHING REEL DEVICE

Filed May 23, 1949          2 SHEETS—SHEET 2

INVENTOR.
ARTHUR W. SAWITZKE
BY

Patented Jan. 6, 1953

2,624,523

UNITED STATES PATENT OFFICE 2,624,523

FISHING REEL DEVICE

Arthur W. Sawitzke, Cleveland, Ohio

Application May 23, 1949, Serial No. 94,771

3 Claims. (Cl. 242—84.5)

My invention relates to fishing reels.

My invention is directed to an improved fishing reel having a construction providing advantages of use not heretofore obtainable.

Another object is the provision in a reel of an improved clutching arrangement.

Another object is the provision of a fishing reel having an improved structure for providing a braking action to the reel.

Another object is the provision of a novel construction and unique arrangement in a fishing reel providing for ready and convenient control of the operation of the reel.

Another object is the provision of an improved reel having finger-tip control of the operation of the reel.

Another object is the provision for disposing and arranging the control element of a reel for ready and convenient manipulation with the hand of the person holding the rod upon which the reel is mounted.

Another object is the provision of a novel fishing reel having a control lever disposed longitudinally of the reel and adapted to be disposed longitudinally of the rod on which the reel is mounted and in juxtaposition to the rod handle for ready and convenient movement with the hand of the person holding the rod.

Another object is the provision of an improved structure in a fishing reel provided for coordinated control by the user.

Another object is the provision of a unique combination of clutching and braking features with a unitary control of both features.

Another object is the provision of an improved fishing reel so arranged that there is an elimination or minimization of backlash of the line in casting with the reel.

Another object is the provision of a fishing reel so arranged that there is flexibility in the use of the reel to meet varying conditions of use.

Another object is the provision of a fishing reel constructed and arranged for universal use in various types of fishing.

Another object is the provision of an improved fishing reel which is economical of construction and efficient in use.

Other objects and a fuller understanding of my invention may be had by referring to the following description and claims, taken in conjunction with the accompanying drawings, in which:

Figure 1:
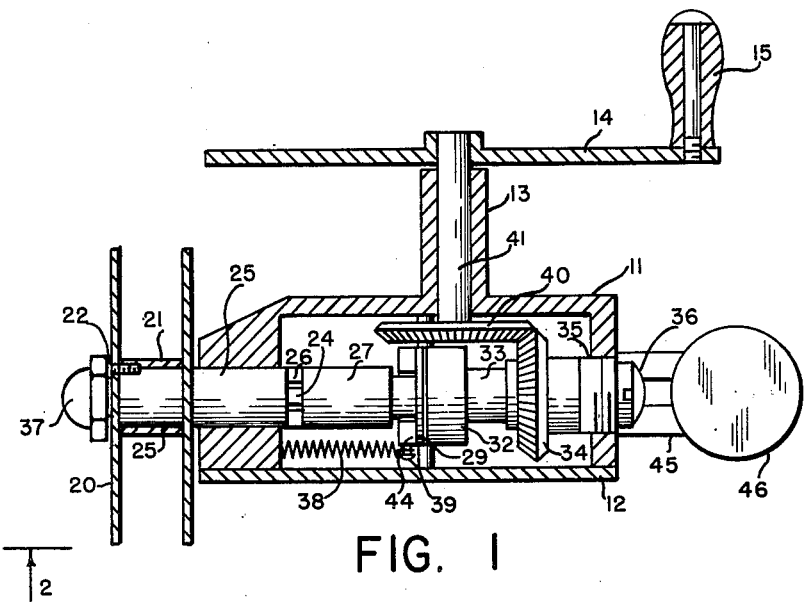
Figure 1 is a longitudinal, sectional view taken horizontally of my fishing reel and is a view taken through the line 1—1 of Figure 2.

With reference to the several views of the drawings, the reference character 11 indicates the casing or housing of my fishing reel, the casing 11 being hollow to accommodate the mechanical parts incorporated in the reel. One side of the casing is open and there is a removable side plate or inspection plate 12 which is provided to close this open side. The side plate 12 is secured to the housing or casing 11 by screws or other suitable means. Extending from the casing 11 on the side opposite the side plate 12, there is a hollow extension 13 of the casing 11, which casing extension 13 is for carrying a crank and handle used in the operation of the reel. A crank arm 14 is mounted at the outer end of extension 13 and a handle 15 pivotally connected to an end of the crank arm 14 is provided for turning the mechanical parts of the reel as desired.

Secured to the lower end of the casing 11 by screws or other suitable means is a bracket member 16 extending downwardly and rearwardly from the casing 11. This bracket 16 has integral therewith a longitudinal member or engaging portion 17 on its lower end. The engaging portion 17 is disposed in a direction longitudinally of the casing 11 and is adapted to be disposed longitudinally of a fishing rod upon which the reel is mounted. The engaging portion 17 clips in and is secured to the fishing rod by the usual attaching means carried by a fishing rod adjacent the handle thereof.

Figure 2:
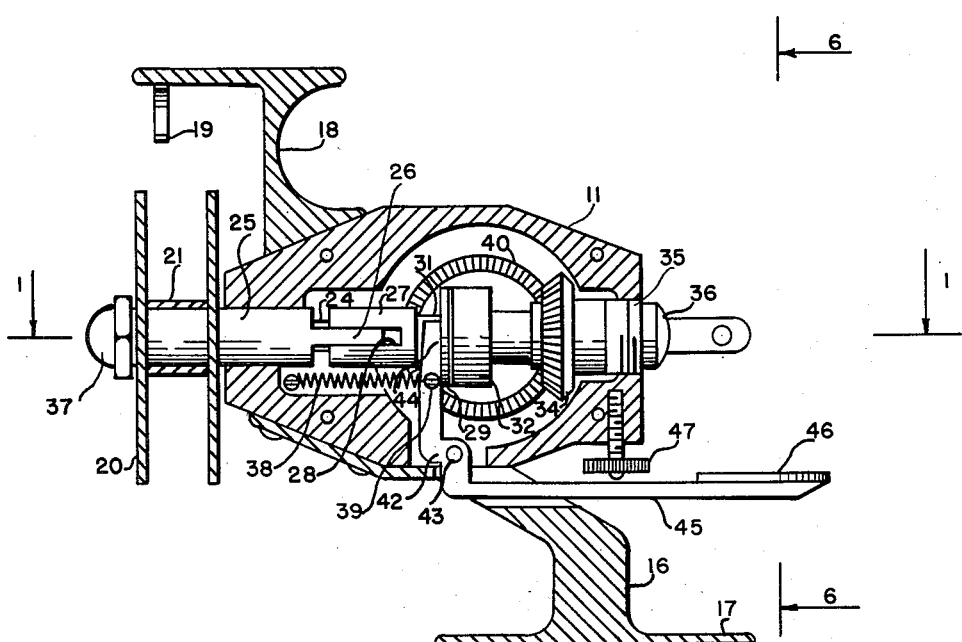
Figure 2 is a longitudinal, sectional view of my fishing reel taken in a plane vertical of the reel and is a view looking in the direction of the arrows 2—2 of Figure 1, in which the side plate or inspection plate has been removed to more readily show the interior of the fishing reel.
Figure 3:
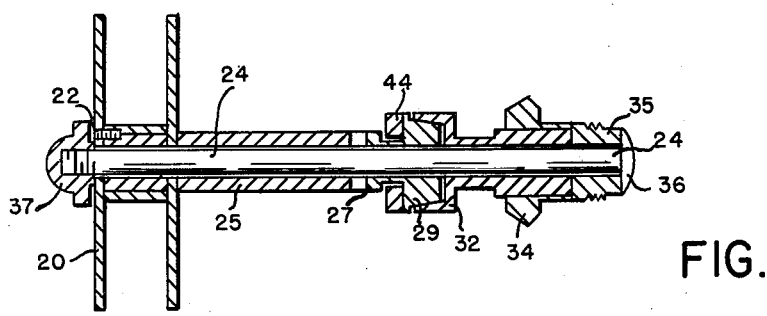
Figure 3 is a detailed and longitudinal sectional view of the parts of my reel mounted upon a longitudinally disposed shaft.
Figure 4:
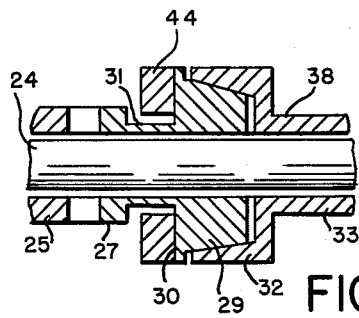
Figure 4 is an enlarged sectional view illustrating the clutching mechanism of my reel and shows the clutch in closed or engaged position.
Figure 5:
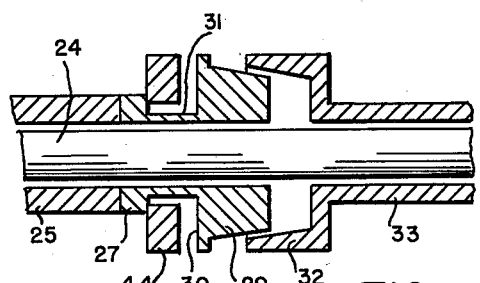
Figure 5 is another enlarged sectional of the clutching mechanism shown in Figure 4 and illustrates the clutch in open or disengaged position.
Figure 6:
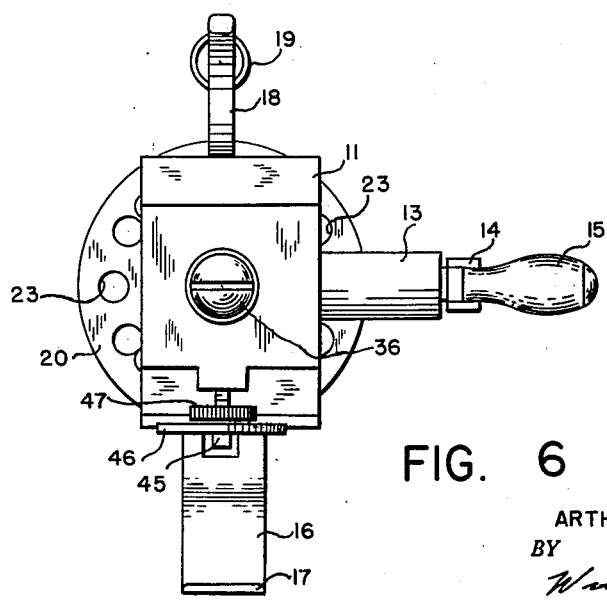
Figure 6 is an end view of my fishing reel looking in the direction of the arrows 6—6 of Figure 2.

In the present description and claims the forward end of the fishing reel is to be considered the end of the fishing rod at the left-hand side of the views in Figures 1 and 2, the rear end of the fishing reel is to be considered the right-hand end of said views, the top is considered as the top looking downwardly in the direction of the arrows 1—1 of Figure 2 and the bottom of the fishing reel is to be considered that portion disposed in the direction of the engaging portion 17 of bracket 16, that is, the part of the reel closest to the fishing rod upon which the reel is mounted.

Mounted by screws or other suitable means to the top of the casing 11 and adjacent the forward end of the casing 11 is a ring or guide support member 18, and carried on a forwardly extending arm of support 18 is a ring or guide 19 adapted to provide a bearing support for a fish line, the fish line being threaded through the ring or guide 19 and being free to slide or run therethrough.

Extending through and longitudinally of the casing 11 is a shaft 24, the forward end of the shaft 24 extending through the wall of the casing and forwardly thereof. Mounted upon the forward end of the shaft 24 and in advance of the casing 11, is a spool or reel 20 upon which the fishing line is wound in the usual manner between two spaced discs. The fish line spool 20 has a center core or arbor 21 upon which the line is wound between the two spaced discs. To lighten the weight of the spool 20, and thus minimize the inertia thereof, either while static or in motion, there are provided a plurality of small holes 23 in the spaced discs of the reel.

A pair of intersplined sleeves 25 and 27 are mounted upon the shaft 24 and are adapted to rotate in respect to the shaft 24. The forward or first sleeve 25 extends through the forward wall of casing 11 and freely rotates relative thereto, the casing forming a bearing support for the forward sleeve 25. The spool 20 is keyed to the front end of the first sleeve 25 by means of a small set screw 22, directed longitudinally of the reel in a longitudinally provided threaded hole between the sleeve 25 and the arbor 21 of the spool. The set screw 22 has one function of interlocking the spool 20 and sleeve 25 so that they rotate together. It also has another function of placing the weight of the spool 20 slightly off center. The weight of the set screw provides an additional weight displaced from the axial center of the spool. This provision helps in eliminating any possible backlash, in minimizing over-run of the reel, in casting after the bait has struck the water and the pull on the line has lessened. The speed of the spool thus tends to slow up after the bait has landed somewhat sooner by reason of this slight off-center weight.

The spool 20 and sleeve 25 secured thereto are held on the forward end of the shaft 24 by means of a retaining nut 37 threadably secured to the forward end of the shaft 24. The spool 20 may thus rotate on the shaft 24 to wind or unwind a fishing line extending from the reel 20 up through the guide 19 and forwardly out along the fishing rod. As is apparent from the drawings, the spool or reel 20 is disposed transversely of the reel and the axis of the spool is disposed longitudinally of the casing 11.

The second or rearward sleeve 27 has oppositely disposed key-ways or slots 28 and the first or forward sleeve 25 has rearwardly extending keys or tongues 26, slidably engaged in the respective key-ways or slots 28. The arrangement is such that the second or rear sleeve may be moved longitudinally on the shaft 24 and toward and away from the first or forward sleeve 25 and at the same time the two sleeves 25 and 27 are splined or keyed together so as to rotate in unison.

Carried by and integral with the second or rearward sleeve 27 is a first clutch part 29, terminating in a male portion of frusto-conical form. The clutch part 29 is cut away to form the annular recess 31 at a location forwardly of the male clutch portion. There is an annular surface or annular shoulder 30 defining the rear wall of the annular recess 31 and providing a laterally extending engaging surface circumferentially around the first clutch part 29. The annular surface 30 is relatively smooth to provide a sliding surface.

There is a second clutch part 32 having a female engaging portion of frusto-conical form complementing the male part 29 of the clutch. Carried by and extending rearwardly from the second or female clutch part 32 is a connecting portion 33 in hollow cylindrical sleeve form. Carried by and non-rotatably secured to the connecting sleeve 33 is a gear member 34, having beveled gears as illustrated in the drawings. The rotation of gear member 34 causes the second or female clutch part 32 to rotate therewith and conversely the rotation of the second or female clutch part 32 rotates the gear member 34. An end sleeve 35 supports the rear end of the shaft 24 and is threadably secured to the rear wall of the casing 11. A cap screw 36, threadably secured to the shaft 24 upon its rearward end, retains the shaft 24 in position.

It is to be noted that sleeves 25 and 27, the clutch parts, and gear member 34 are all rotatively mounted on shaft 24. The spool 20 and the shaft 24 and all the parts mounted thereon are in axial alignment as shown in the drawings.

The shaft 24 may have such a fit and engagement at its opposite ends where secured by the nut 27 and set screw 36, that it may rotate with the spool 20 or may freely float so as to rotate or not, depending on the relative resistance offered at different locations along its length. I prefer, however, that the shaft 24 is stationary and does not rotate with the several members mounted thereon. This may be readily effected by so securing the cap screw 36 as to non-rotatably engage the end sleeve 35, which in turn is secured to the casing 11. By this arrangement, the spool 20 really rotates on the shaft 24 and the parts in engagement with the spool 20 rotates therewith upon the shaft 24.

A gear member 40 that is larger in relation to gear member 34 is enmeshed with gear member 34 and is arranged to drive gear member 34 in the ratio determined by their respective sizes. The gear member 40 is non-rotatably secured to and carried by a shaft 41, disposed in extension 13 so as to rotate therein, the outer end of the drive shaft 41 being non-rotatably secured to the crank 14. Thus, revolving the handle 15 to turn the crank 14 rotates the drive shaft 41 to rotate the gear member 40 and through it the gear member 34. The handle 15 and gear member 34 are thus positively connected together so that rotation of one rotates the other.

An actuating member 42 is pivotally carried by the casing 11 upon pin 43 disposed transversely of the casing 11, one end of the pin 43 being secured to the casing wall and the other end of the pin 43 being secured or carried by the side plate 12. The actuating member 42 has two portions disposed substantially at right angles to each other, one portion being the engaging portion 44 and the other portion being the lever portion 45. The engaging portion 44 is disposed to extend upwardly and has its upper end forked to provide a yoke disposed in the annular recess 31 of the second or rearward sleeve 27. The engaging portion 44 at its forked end embraces the sleeve 27 at its narrowest section and is disposed between the opposed walls of the annular recess 31. The larger of these walls is the annular surface 30 forwardly of the first or male part of the clutch. Upon rearward movement of the upper forked end of the engaging portion 44 of the actuating member, this forked engaging portion engages and presses against this annular surface 30. Upon the engaging portion 44 of actuating member 42 pressing rearwardly against the annular surface 30, the first or male part of the clutch is moved rearwardly in opposition to a coil spring 38 to move the clutch into engaging position. The intersplined arrangement of tongues 26 in grooves or slots 28 of the first and second sleeve members permits this longitudinal movement of the second sleeve and male clutch part carried thereby. Upon release of any rearward movement of the engaging portion 44 so as to release the pressure against the annular surface 30, the coil spring 38 will pull the clutch parts apart into disengaged position.

The lever portion 45 of the actuating member 42 is positioned below the casing 11 and extends in a rear direction therefrom so as to protrude rearwardly beyond the rear end of the casing. Secured to and carried by the rear end of the lever portion 45 is a thumb or finger rest 46 adapted to be engaged by the thumb or finger of a person holding the fishing rod upon which the fishing reel is mounted, and arranged to be pressed downwardly by a thumb or finger of the person with the same hand by which the rod is grasped. The rest 46 is above or slightly in advance of the forward end of the handle so that the user's thumb or finger of the hand supporting the rod may readily press upon the rest portion 46 of lever portion 45. By reason of the lever arrangement, manipulation of the lever portion 45 at its rearward end provides for a delicate and fine control over the forward or rearward longitudinal movement of the engaging portion 44 in respect to the clutch mechanism.

An adjustable stop member 47 is threadably carried by the rear end of the casing 11 and is adapted to be moved downwardly to provide a stop or upward limit to movement of the lever portion 45. By turning the adjustable stop member 47 downwardly to where it presses down tightly against the top of the lever portion 45, the lever portion 45 will be held firmly downward and the engaging portion 44 will be held firmly rearwardly. The use of the adjustable stop 47 is particularly advantageous in the use of the reel for still fishing so that the clutch is firmly held in engaged or clutching position and the spool 20 is retained in driving connection with the crank 14 and handle 15.

A spring 38 anchored at one end to the casing 11 and at the other end to a pin 39 secured to engaging portion 44 of actuating member 42, is biased to resiliently urge the engaging portion 44 forwardly. By reason of the positioning of the forked end of engaging portion 44 in the recess 31, forward resilient pull of coil spring 38 urges the clutch parts into disengaged position.

It is seen that the arrangement herein described provides for an adjustable and delicate control of the operation of the reel by pressing the thumb rest 46 downwardly, a frictional engagement is provided between the male and female parts of the clutch, the degree of firm frictional engagement depending upon the downward pressure of the thumb rest 46. Since the interengaging surfaces of the clutch are smooth, some slipping action is permitted by a moderate amount of downward pressure on thumb rest 46. A more firm pressure on thumb rest 46 more securely holds the clutch in engaged position. However, any unusual pull upon the fishing line, such as by the fish plunging or jerking on the line so as to cause the spool 20 to rotate by reason of the pull on the line, there is provided a clutch arrangement which will permit the clutch to slip and to permit the spool to rotate under such condition, but at the same time to provide a drag or retarding action to rotation of the spool. If the handle 15 is firmly held, then interengagement of the clutch parts and their smooth interengaged surfaces permits a slippage and also a frictional resistance to rotation of the reel; and thus there is provided a brake to rotation of the reel when the line is suddenly pulled or jerked outwardly relative to the reel.

When the handle 15 is not firmly held, but the crank arm 14 is permitted to revolve, then a sudden rotation of the reel 20 by a sudden outward jerk of the line will, through the engaged clutch, tends to cause the interengaged gear members to rotate and the crank arm to revolve. Through the work of having to rotate the gear members and parts moved thereby, when the clutch is in engaged position and a sudden outward pull is placed upon the line to rotate the spool 20, a drag or resistance is offered to such sudden rotation of the spool 20 and thus a braking action is afforded. The non-positive engagement between the clutch parts is, however, such that the clutch will slip and permit some rotation of the spool 20 even though the handle 15 is held against movement when there is an excessive pull on the line rather than have the line break by reason of such excessive pull. This provides a safety factor in that the parts may be adjusted to resist sudden jerks and outward pulls on the line and at the same time enough slippage of the mechanical parts may be permitted to safeguard the line against breaking by reason of such sudden and quick jerks upon the line.

The arrangement also provides another feature as is seen from the above description. The engagement of the engaging portion 44 against the annular surface 30 is such that with a moderate amount of pressure downwardly on thumb rest 46 there is permitted enough slippage between the engaging portion 44 and this annular surface 30 to permit the clutch to rotate notwithstanding the non-rotative position of the engaging portion 44. However, to provide an additional braking action, greater downward pressure on the thumb rest 46 so as to increase the pressure of the engaging portion 44 against the annular surface 30 of the movable clutch member provides greater resistance against rotation of the movable clutch member and a braking action to further rotation. Therefore, the amount of braking action between the engaging portion 44 of the actuating member and the clutch member may be determined by the amount of downward pressure on the thumb rest 46.

The engaging portion 44 therefore serves the purpose of moving the clutch into engagement, as heretofore described, and also serves the purpose of providing a friction brake to rotation of the movable clutch parts, this braking action being dependent upon the downward pressure on the thumb rest 46. The one actuating member 42 serves both to control the clutching action and the braking action of the engaging portion pressing against the annular surface 30. The one control member actuated by the thumb or finger of the user thus provides a delicate and carefully selectable control of the reel mechanism by providing the amount of clutching engagement desired and the amount of braking action desired. Together with the handle 15, there is also provided the desired amount of drag or retardation to movement of the parts when in clutched engagement. A very fine manipulation of the reel mechanism is afforded by the construction shown and the parts are so arranged for ready control by the user holding the rod, that an improved use of the reel in fishing is facilitated. In casting, after the bait hits the water and the outward pull upon the line is slackened, any backlash that might occur is minimized by pressing the thumb rest 46 downwardly sufficiently to engage the clutch parts to such a degree that rotation of the reel by overrun or inertia will be retarded and minimized in that the rotation will cause or tend to cause movement of the gear member and the crank, the degree of this retardation being dependent upon the degree of firm clutching engagement of the clutch. Any further braking action beyond that required by the clutch and associated parts may also be provided by the additional braking action of the engaging portion 44 pressing against the annular surface 30 to the degree determined by the downward pressure on the thumb rest 46.

Other advantages and benefits will be apparent to one knowing the problems, difficulties and conditions of fishing and of the various types of fishing done. The present reel gives greatly increased and improved efficiency in casting and in fishing operations and at the same time incorporates several safety features and safeguards as herein described. Casting ability is greatly increased and it has been found that with the use of this reel many persons who heretofore could cast with but a favored hand may now readily cast with either hand. Trouble of backlash is largely eliminated, difficulties in breakage of the line through sudden jerks is greatly minimized, and the pleasures of fishing are considerably increased.

The present disclosure includes by reference herein the description contained in the appended claims, as well as the foregoing description. Although the drawings and foregoing description disclose the preferred form of my invention, other forms and arrangements within the spirit and concept of my invention will be readily apparent and these are considered as part of my invention as herein claimed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of my invention as hereinafter claimed.

What is claimed is:

1. A fishing reel device adapted to control the extension and retraction of a line, said device being mountable on a rod having a handle portion, said device comprising in combination a hollow casing, a mounting member for mounting said casing to said rod, a shaft extending longitudinally of, and carried by, said casing and having an end portion extended through a wall thereof, a spool mounted on said end portion of the shaft, a first sleeve member and a second sleeve member in non-rotative engagement with each other carried by said shaft, said first sleeve member being non-rotatively engaged to said spool and said second sleeve member being movable longitudinally of said shaft relative to said first sleeve member, a gear member carried by said shaft, manually operable driving means carried by said casing and engaging said gear member for revolving the same, a pair of complementary and opposed clutch members carried by said shaft, one of said clutch members being connected to said second sleeve member and the other of said clutch members being connected to said gear member, said one of said clutch members having an annular shoulder portion extending therearound, said spool, sleeve members, gear member and clutch members being axially aligned on the axis of said shaft, and said annular shoulder portion being disposed at an angle to the said axis, an actuating member pivotally carried by said housing, said actuating member having an engaging portion disposed at an angle to said axis and adapted to engage said shoulder portion and having an operating portion extending outwardly from said casing for the movement of said engaging portion, said engaging portion being movable in a direction longitudinally of said axis to press against said shoulder portion, pressure of said engaging portion against said shoulder portion moving said one of said clutch members into clutching engagement with the said other of said clutch members and the interengagement of said engaging portion and shoulder portion providing a frictional braking action dependent upon the degree of said pressure, the clutching engagement of said clutch members operatively connecting said spool and driving means through said sleeve members, clutch members and gear member and said braking action providing for resistance to rotation of said spool non-rotatively engaged to said sleeve members, said clutching engagement and braking action being controlled by operation of said operating portion of said actuating member.

2. A fishing reel device comprising in combination a housing, mounting means for mounting said housing longitudinally of, and in juxtaposition to, a fishing rod, a shaft carried by, and disposed longitudinally of, said housing, a rotatable spool carried by said shaft and positioned forwardly of said housing, a driving member carried by said shaft, operating means carried by said housing for operating said driving member, a rotatable driving mechanism carried by, and in axial alignment with, said shaft and adapted to provide a driving connection between said spool and said driving member, said driving mechanism including a clutch mechanism having two parts frictionally engageable with each other in clutching position and disengageable with each other in non-clutching position, one of said parts having a radially extending annular surface portion, an actuating member carried by said housing and having an engaging portion movable longitudinally of said housing and relative to the other of said parts, said engaging portion being adapted to engage said annular surface portion of said one part at a radial distance from the axis of said clutch mechanism, movement of said engaging portion toward said other part moving said one part into clutching engagement with said other part, variation in the movement of said engaging portion varying the degree of frictional engagement between said parts and varying the degree of frictional engagement at said radial distance between said engaging portion and said annular surface, variation in frictional engagement of said parts providing selected clutching action and variation in frictional engagement at said radial distance of said engaging portion and annular surface providing selected braking action, said actuating member having a manual control portion extending rearwardly from said housing in juxtaposition to said mounting means for manipulation at a location in the vicinity of said rod and rearwardly of said housing.

3. A fishing reel device comprising in combination a housing, mounting means for mounting said housing longitudinally of, and in juxtaposition to, a fishing rod, a shaft carried by, and disposed longitudinally of, said housing, a rotatable spool carried by said shaft and positioned forwardly of said housing, a driving member carried by said shaft, operating means carried by said housing for operating said driving member, a rotatable driving mechanism carried by, and in axial alignment with, said shaft and adapted to provide a driving connection between said spool and said driving member, said driving mechanism including a clutch mechanism having two parts frictionally engageable with each other in clutching position and disengageable with each other in non-clutching position, biasing means urging said clutch mechanism in non-clutching position, one of said parts having an annular surface portion, an actuating member carried by said housing and having an engaging portion movable longitudinally of said housing and relative to the other of said parts, said engaging portion being adapted to engage said annular surface portion of said one part at a radial distance from the axis of said clutch mechanism, movement of said engaging portion toward said other part moving said one part, in opposition to said biasing means, into clutching engagement with said other part, variation in the movement of said engaging portion varying the degree of frictional engagement between said parts and varying the degree of frictional engagement at said radial distance between said engaging portion and said annular surface, variation in frictional engagement of said parts providing selected clutching action and variation in frictional engagement at said radial distance of said engaging portion and annular surface providing selected braking action, said actuating member having a manual control portion extending rearwardly from said housing in juxtaposition to said mounting means for manipulation at a location in the vicinity of said rod and rearwardly of said housing.

ARTHUR W. SAWITZKE.

REFERENCES CITED

The following references are of record in the file of this patent:

UNITED STATES PATENTS

| Number | Name | Date |
| --- | --- | --- |
| 1,284,039 | Atwood | Nov. 5, 1918 |
| 1,508,080 | Wise | Sept. 9, 1924 |
| 1,559,927 | Baker | Nov. 3, 1925 |
| 2,271,383 | Bannister | Feb. 3, 1942 |
| 2,313,470 | Garzo | Mar. 9, 1943 |

FOREIGN PATENTS

| Number | Country | Date |
| --- | --- | --- |
| 256,183 | Switzerland | Feb. 16, 1949 |
| 470,695 | Great Britain | Aug. 19, 1937 |